United States Patent [19]

Graham

[11] 4,149,928
[45] Apr. 17, 1979

[54] MANUFACTURE OF INSULATION PRODUCTS

[75] Inventor: Robert Graham, Chester-le-Street, England

[73] Assignee: Newalls Insulation Company Ltd., Manchester, England

[21] Appl. No.: 752,535

[22] Filed: Dec. 20, 1976

[51] Int. Cl.² .......................................... B65H 81/00
[52] U.S. Cl. ................................. 156/446; 156/62.6; 156/184; 156/499; 93/81 MT
[58] Field of Search .................... 156/184, 446, 62.6, 156/499, 191, 443, 62.8; 93/81 R, 81 MT; 432/242

[56] References Cited

U.S. PATENT DOCUMENTS

| 2,331,146 | 10/1943 | Slayter | 156/62.2 X |
| 2,569,856 | 10/1951 | Hill | 93/81 R |
| 2,978,237 | 4/1961 | Frank | 432/242 X |
| 3,252,388 | 5/1966 | Schur | 93/81 R X |
| 3,344,009 | 9/1967 | Levecque | 156/446 |
| 3,479,239 | 11/1969 | Hullhorst | 156/446 X |
| 3,761,342 | 9/1973 | Richards et al. | 93/81 R X |

FOREIGN PATENT DOCUMENTS

| 2268615 | 0000 | France. |
| 1430286 | 3/1976 | United Kingdom. |

*Primary Examiner*—David A. Simmons
*Attorney, Agent, or Firm*—William Anthony Drucker

[57] ABSTRACT

Apparatus for producing lengths of tubular pipe insulation from fibrous web material. A mandrel is provided, together with turret means which index the mandrel from a winding station where it is wrapped with the fibrous web, through a curing station and a discharge station back to the winding station.

5 Claims, 4 Drawing Figures

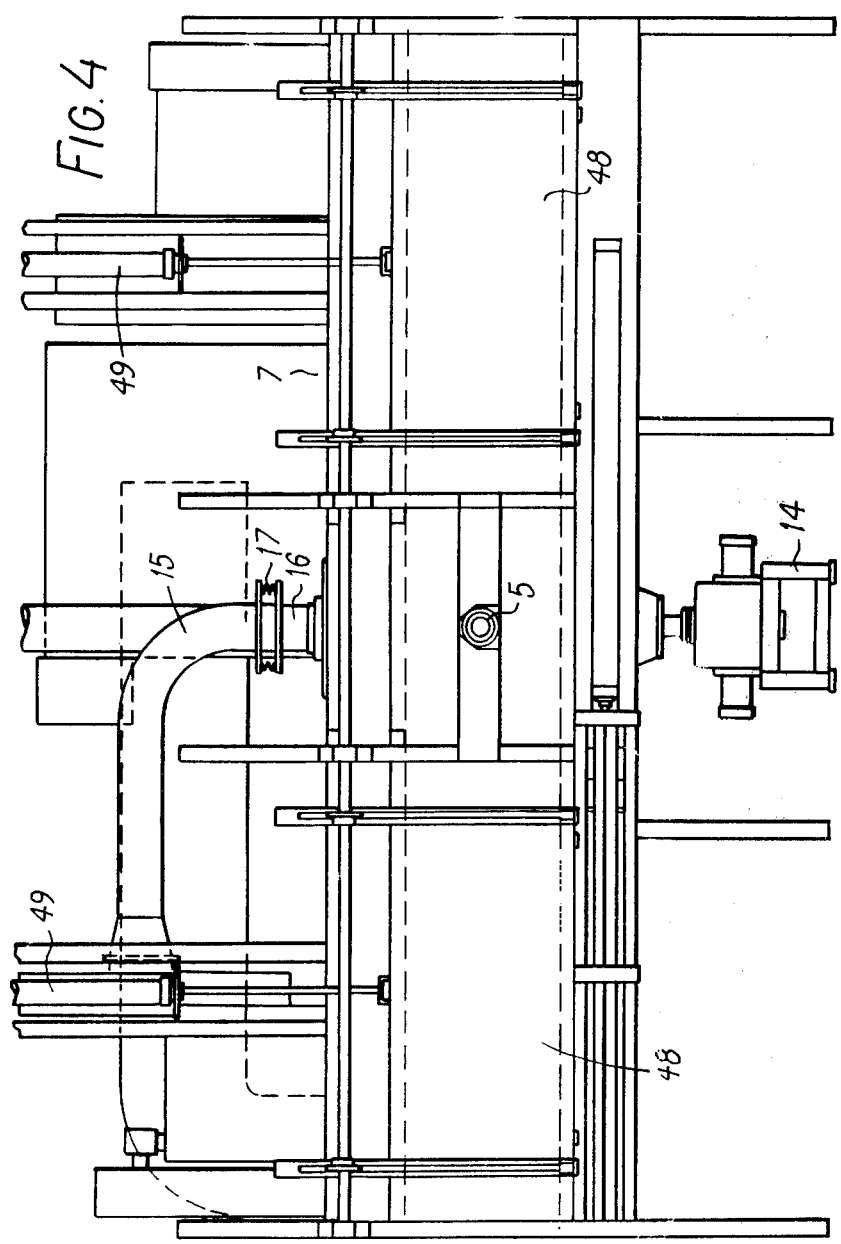

MANUFACTURE OF INSULATION PRODUCTS

The present invention relates to the manufacture of lengths of tubular pipe insulation from fibrous web materials such as glass fibre mat or fleece. Pipe insulation products of this kind will be referred to as "sections" for the purposes of this specification. Hitherto sections have been made by wrapping a length of a thermoset resin impregnated fibrous web material around a mandrel and then heating to cure the resin. Usually, the process is carried out semi-continuously using a large number of mandrels which progress through the various stages of section manufacture and are eventually returned to the starting point when the finished section has been stripped off for any necessary final finishing treatment.

However, the large number of mandrels needed for one bore size of section and the even larger number of mandrels needed to provide a range of bore sizes is inconvenient. It is an object of the present invention to significantly reduce the stock of mandrels required to make a range of sections by the conventional process just described.

According to the present invention, apparatus for producing lengths of tubular pipe insulation comprises a mandrel and turret means for indexing it successively through a winding station provided with feed means operable to wrap a predetermined length of thermosettable resin impregnated fibre mat onto the mandrel, a curing station provided with heating means capable of curing the resin, and a discharge station at which the length of tubular pipe insulation is removed from the mandrel, prior to the latter being indexed back to the winding station.

The curing station is preferably an oven, which may be provided with doors to contain the heat. Where doors are provided, means for opening and closing the doors in synchronism with the operation of the indexing means may also be provided. To enhance the heating effect of the oven, the mandrel may be hollow and provided with apertures enabling air to be displaced through it and through a length of insulation on it. A fan communicating with the inside of the mandrel may be provided for this. Preferably the airflow can be reversed so that the flow can either be from outside to inside or from inside to outside of the mandrel. It is particularly preferred that the direction of flow be dependant on the position of the mandrel, that is on the station through which it is being indexed. Advantageously, the apparatus is arranged to draw air from outside to inside at the winding station, but at other stations, the flow is from inside to outside, as will be further explained later.

The apparatus may further include another fan arranged to re-circulate the air in the oven through a heater. Preferably a number of mandrels are provided, so that winding, curing, and discharge can be carried out more or less continuously without undue delays between them. In this case the use of four mandrels arranged mutually at right angles on a common turret is particularly preferred. In this case, the particularly preferred airflow is from outside to inside of the mandrel at the winding station and from inside to outside of the three other mandrels. Conveniently, this is accomplished by making the flow direction change as successive mandrels approach and leave the winding station, for example, using a flow reversing valve system associated with the indexing mechanism. By adopting this arrangement, the airflow direction at the winding station is such as to aid the formation of a compact roll of fibrous web on the mandrel. At the other stations, the flow from inside to outside can be of hot air from the oven itself; this tends to keep the mandrel hot as well as the inner parts of the roll, thereby ensuring that the resin is not only cured on the outside of the roll, but also right through to the mandrel. When the latter leaves the oven, the resin fumes from the section on it tend to be significantly lower than they would be with no air circulation.

The feed means at the winding station may include a conveyor band arranged to present the predetermined length of fibre mat to a mandrel at the station. The mat-carrying surface of the band may be biassed towards the mandrel in order to apply pressure during winding and if so, the feed means preferably includes a mechanism operable to displace the band clear of the mandrel during indexing.

The feed means preferably also includes a mechanism operable to rotate the mandrel about its longitudinal axis while it is at the winding station. This mechanism could be associated with the indexing means for the mandrel but it is more convenient to make it a part of the winding station; for example, a simple dog clutch arrangement engageable in an end of the mandrel and connected to a small geared motor may be employed. This is particularly convenient where a number of mandrels are rotatably mounted on a common turret.

The invention also includes a method of making lengths of tubular pipe insulation, from predetermined lengths of thermosetting resin impregnated fibrous web material, said method comprising winding said length onto a mandrel at a winding station, indexing said mandrel by means of a turret from said winding station through a curing station where the resin is cured, then through a discharge station where the length of tubular pipe insulation is removed from the mandrel and then back to the winding station. It further includes lengths of tubular pipe insulation made by the method.

In order that the invention be better understood, a preferred embodiment of it will now be described by way of example with reference to the accompanying drawings in which:

FIG. 4 is an end view along line CC of FIG. 1.

Like reference numerals will be used for like parts, where possible, on all four figures.

Figure 1:
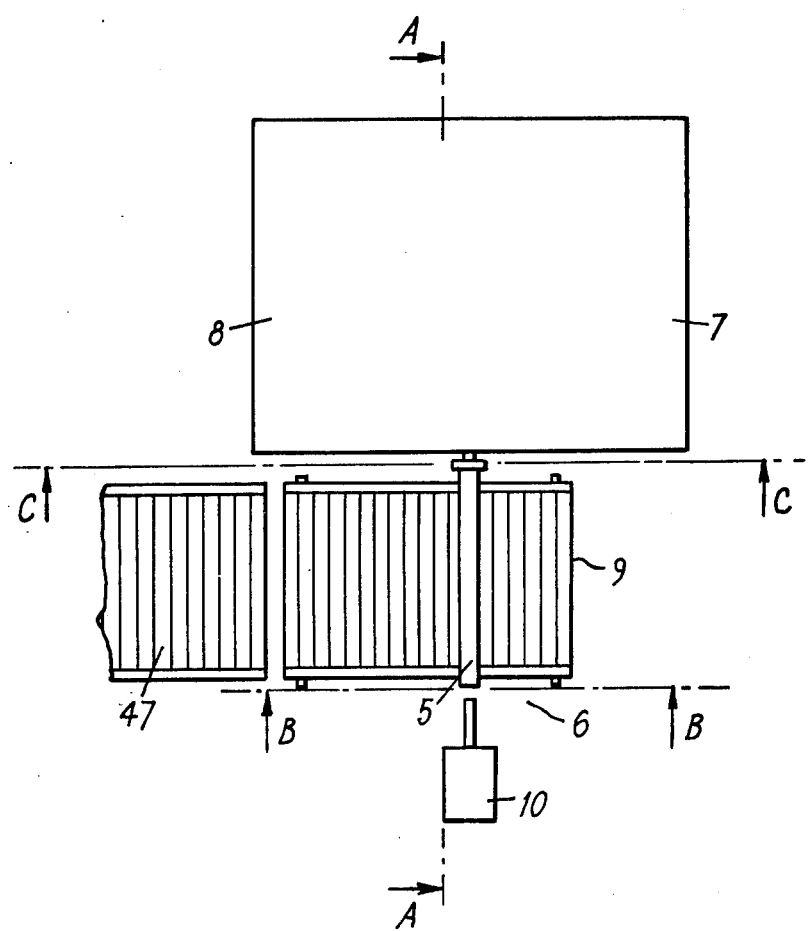
FIG. 1 is a greatly simplified schematic plan view of an apparatus in accordance with the invention.

In FIG. 1, a mandrel 5 is indexable through a winding station 6 into a curing oven 7 and thence to a discharge station 8. The mandrel is one of a set of four, all freely rotatably mounted mutually at right angles on a turret located inside the oven. At the winding station a conveyor 9 is provided to present a predetermined length of thermosetting resin impregnated glass fibre mat to the mandrel for wrapping thereon, a drive unit 10 being provided to rotate the mandrel for this purpose.

Figure 2:
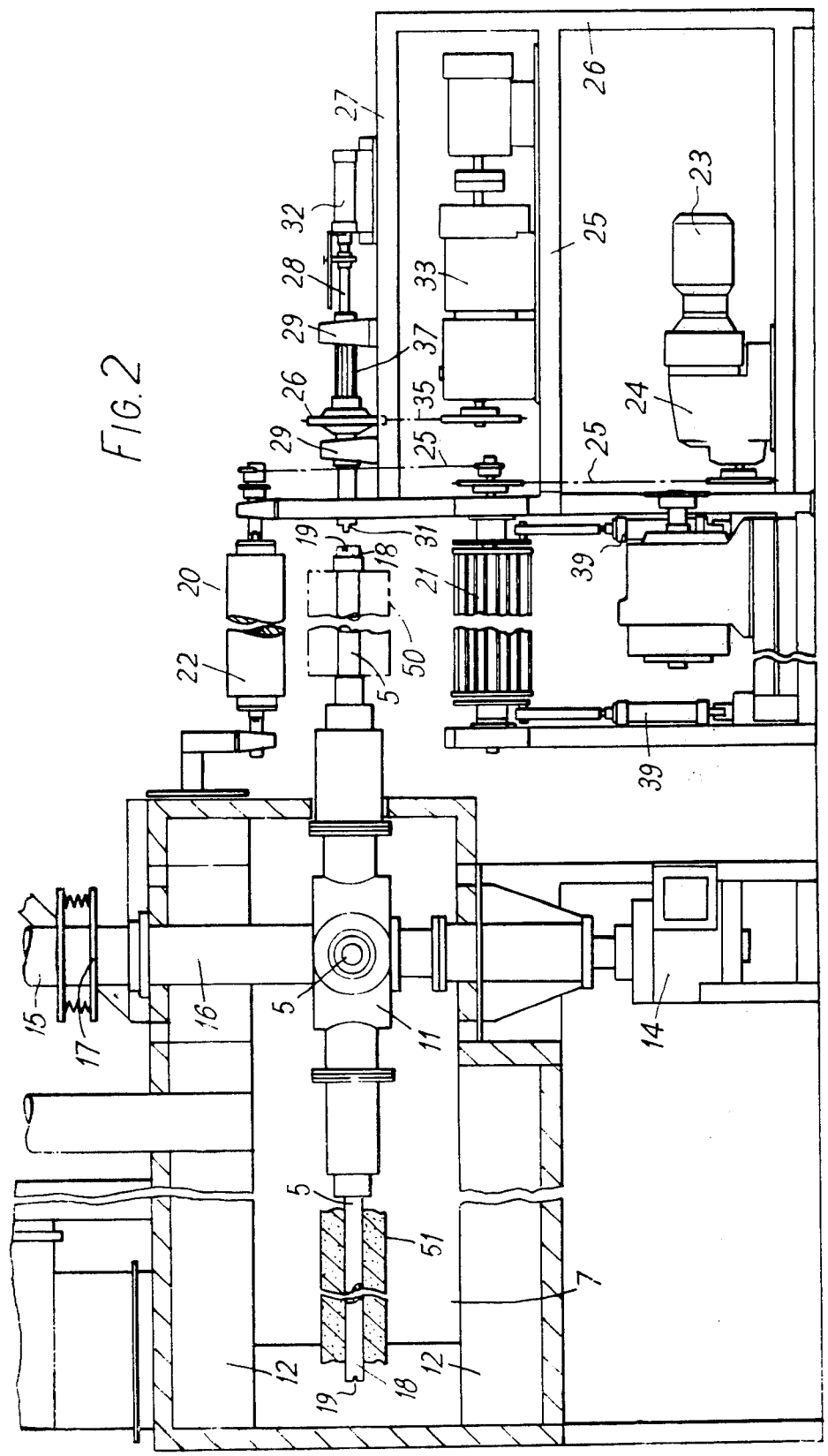
FIG. 2 is a partly sectional side view along line AA of FIG. 1.
Figure 3:
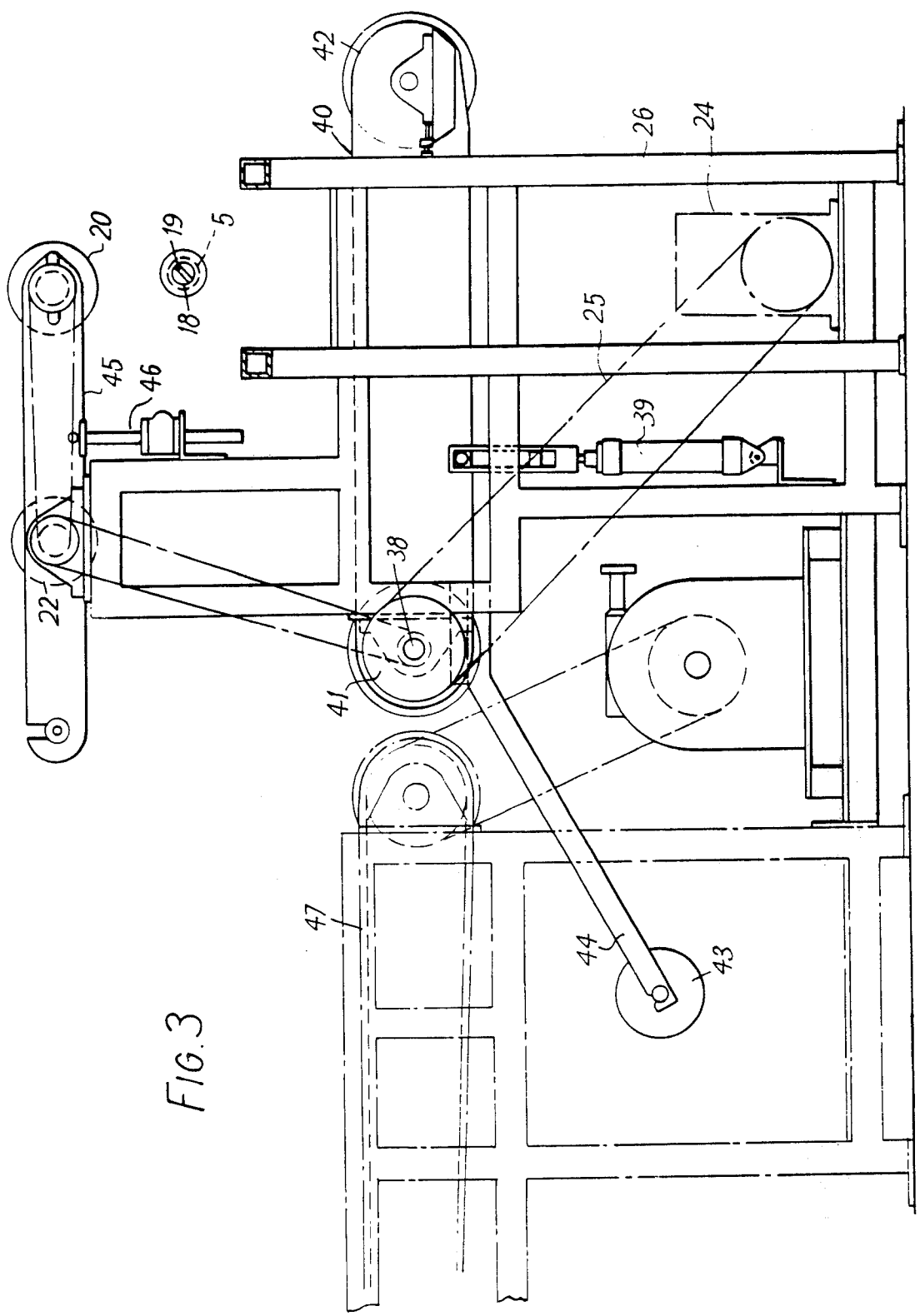
FIG. 3 is a partly cut away end view along line BB of FIG. 1.

Referring now to FIGS. 2, 3 and 4 which show the various parts of the apparatus of FIG. 1 in considerably more detail, FIG. 2 is a composite view in which the left-hand half is essentially in section and shows the oven 7. The oven is a closed chamber and a turret 11 is mounted in it for rotation about an axis normal to the top and bottom walls 12 of the oven. The turret carries four freely rotatable mandrels 5 mutually at right angles and constrained to follow a substantially circular path in a plane parallel to and approximately half way between the walls 12.

The turret is rotated by a four position indexing drive 14 mounted below the oven, whilst the upper end 15 of the turret drive spindle 16, which is hollow, is connected through a rotatable seal unit 17 to an extractor fan (not shown). The drive spindle contains a non-rotating partition extending lengthwise of it to constitute a valve mechanism effective to separate the airflows to the three mandrels inside the oven from that to the mandrel at the winding station. The fan is arranged to draw fresh air from inside the latter mandrel, while a further fan (also not shown) re-circulates hot air from the oven into the three other mandrels and through the sections they carry, e.g., 51, referred to later, and back into the oven. As the mandrels are successively indexed, the airflow direction reverses automatically. The mandrels are hollow and perforated, the hollow spindle 16 communicating with them through the body of the turret 11. The free ends 18 of the mandrels are closed and contain a slot 19. Referring now to the right-hand half of FIG. 2. the mandrel 5, which is outside the oven, lies between and parallel to a compacting roller 20 and a lattice conveyor 21. For the avoidance of doubt, the roller 20 is actually behind an intermediate roller 22 and is best seen in FIG. 3.

Both the roller and the conveyor are driven by a common drive motor 23 via a gear box 24 and chain drives 25. The motor 23 is mounted in the lower deck of a support frame 26, the top deck 27 of which carries a drive shaft 28 slidably and rotatably mounted in bearing 29. One end of the shaft 28 has a dog member 31 engageable with the slot 19 in the end of the mandrel and a pneumatic cylinder 32 is provided to push the shaft 28 to the left (or right) in the FIG. so as to engage (or disengage) the dog and the slot, as will be described later. An intermediate deck of the support frame 25 carries a drive motor unit 33 for the shaft 28 which is driven through a chain 35 and a sprocket 26 which is axially slidable along a splined keyway portion 37 of the shaft 27.

The conveyor 21 (of which only one end is shown in FIG. 2) can be pivoted about its bearing shaft 38 by means of pneumatic cylinders 39 so as to bring the upper run of the lattice away from the mandrel. This will be further described now in relation to FIG. 3, in which parts of the right hand end portion of the support frame 26 have been omitted in the interests of clarity. In FIG. 3, the conveyor 21 comprises an endless lattice 40, which circulates between a drive roller 41 on bearing shaft 38 and a roller 42. A counterweight 43 on the end of an arm 44 biasses the whole conveyor anticlockwise about the shaft 38 into engagement with the mandrel 5, when the pneumatic cylinders 39 are not operated. The compacting roller 20, previously referred to as being behind the intermediate roller 22, is supported by a pair of arms 45, one only of which can be seen in FIG. 3 and which are freely pivoted to the support frame about the axis of the intermediate roller 22, so that the roller 20 tends to move clockwise under gravity about said pivotal connection. An adjustable stop 46 is provided on the support frame to limit this clockwise movement in accordance with the degree of compaction required in relation to a desired section wall thickness, as will be discussed later.

The conveyor 21 is fed by another lattice conveyor 47, a portion only of which is shown.

FIG. 4 shows the face of the oven 7 as seen from the winding station side. To permit indexing of the mandrel 5 in a plane normal to the figure, the oven is provided with doors 48 which are mounted for sliding movement in the plane of the figure, pneumatic cylinders 49 being provided to effect this movement in synchronism with the operation of the indexing drive 14. It should be noted that the discharge station 8 is provided with a similar door operated by a pneumatic cylinder in like manner, although this is not shown in detail in any of the figures.

The operation of the apparatus will now be briefly described with reference to the figures, starting with the winding station and associated hardware. During winding, the following conditions apply. Firstly, the indexing drive 14 is disabled and the oven doors 48 are both shut, although the door at the discharge station 8 may be open, depending on whether or not a section is to be removed from that mandrel which is at this station. The pneumatic cylinders 39 are not operated, allowing the counterweight 43 to pivot the conveyor lattice 40 (anticlockwise in FIG. 3) into contact with the empty mandrel at the winding station. The pneumatic cylinder 32 is operated to push the dog member 31 into engagement with the mandrel end slot 19 and both motors 23 and 34 are running at this time, so that the conveyor lattice 40 the compacting roller 20 and the mandrel are all in motion with approximately the same surface speed. The fan referred to earlier in relation to the oven is also operating to draw air from the inside of all the mandrels.

A length of thermosetting resin impregnated glass fibre mat is cut or torn off from a supply roll (not shown) and is fed to the conveyor lattice 40 along the conveyor 47, the length being selected to provide a desired section wall thickness. The stop 46 is set to correspond to this thickness, so that the separation between the surfaces of the roller 20 and the mandrel is not such as to under or overcompact the mat during winding. When the leading edge of the length of mat reaches the mandrel and passes between the latter and the lattice 40, the suction due to the fan causes the mat to stick preferentially to the surface of the mandrel and to become wrapped around the latter, as indicated at 50 in FIG. 2 by chain-dotted lines.

When the length is completely wrapped on the mandrel the dog 31 is disengaged by reversing the action of the cylinder 32, and cylinders 39 are operated together with cylinders 49 to open the oven doors. When the doors are open and the conveyor lattice 40 is clear of the newly wound section 50 the indexing drive 14 operates to index the mandrel and section through a right angle into the oven, while presenting a new mandrel to the winding station. The foregoing operations are then repeated until the first-wound section has travelled through 270° from the winding station, (corresponding to two 90° steps inside the oven) and has reached the discharge station. As the newly wound section enters the oven, the airflow reverses and hot air is passed through it from inside to outside, as discussed earlier. At the latter station, the appropriate door is opened to enable the finished section 51 to be drawn off its mandrel for any further processing steps necessary to trim it lengthwise and/or diametrically to a desired length and/or diameter.

The foregoing apparatus and method of operation is capable of modification to eliminate the door at 8 (FIG. 1). If the indexing mechanism is arranged to pause in between successive 90° positions, that is at 45° intervals, one such pause will occur just before the winding station and just after the door 48 (FIG. 4) has been opened to allow a mandrel carrying a section to leave the oven. If a suitable removal device is provided at this point, the section can be removed from the mandrel without the door at 8 (FIG. 1). The section will also have a longer dwell time in the oven, thereby ensuring complete cure of the resin. Alternatively, the longer dwell time in the oven can be used to increase the production rate, because if the cure is completed in, say, two 90° indexing steps, then the remaining dwell in the oven is not necessary and the speed of indexing can be increased until the cure is just completed when the sections emerge from the oven. This of course assumes that the winding speed can be increased in proportion.

Where sections are removed 45° before the winding station, it has been found convenient to do so with a gripper unit arranged parallel to the mandrel whilst in the 45° position just mentioned.

This gripper unit consists of a pair of jaws having gripping surfaces shaped to match the general circular shape of the section and relatively movable to permit a section to be gripped between them. The gripper unit is also movable as a whole in a direction parallel to the longitudinal axis of the mandrel (referring to the 45° position mentioned above) to enable a section to be stripped off the mandrel and then dropped into a suitable receptacle, e.g., tray, by opening the jaws. Reciprocal movement of the gripper unit and the opening and closing of its jaws to carry out this operation may be automatically sequenced to match the operation of the remainder of the machine. The width of the jaws preferably corresponds to a major proportion of the length of the section being handled in order to spread the gripping action of the jaws over a substantial area of the section. The use of such a gripper unit has been found to cause minimal damage to sections.

I claim:

1. Apparatus for producing lengths of tubular pipe insulation from a fleece of fibrous web material, said apparatus comprising, in combination:
   (i) turret means rotatable about an axis
   (ii) means for indexing said turret means about the axis thereof
   (iii) a plurality of hollow perforated mandrels mounted on said turret means and each rotatable about a respective longitudinal axis which is normal to the axis of rotation of the turret means, said mandrels being evenly spaced about the axis of rotation of the turret means
   (iv) a winding station in which each mandrel is in turn temporarily positioned by the indexing motion of the turret means, said winding station having means operable to rotate the positioned mandrel about its longitudinal axis whilst at the winding station, said winding station having feed means operable to present a predetermined length of thermosettable resin-impregnated non-woven fibre mat to said mandrel whilst it is being rotated, whereby said length is wrapped about said mandrel to form a roll thereon,
   (v) a curing station in which each mandrel is in turn temporarily positioned subsequent to the winding station by the indexing motion of the turret means, said curing station comprising an oven with means to contain heat, means displacing air outwardly through said mandrel and means for opening and closing the oven by indexing of the turret means,
   (vi) a discharge station in which each mandrel is in turn temporarily positioned subsequent to the curing station by the indexing motion of the turret means, said discharge station including means for removing a cured length of tubular pipe insulation from the mandrel prior to indexing of said mandrel to said winding station.

2. Apparatus according to claim 1 wherein the feed means comprises a conveyor band biassed towards the mandrel at the winding station so as to apply pressure to the fibrous web material presented to the mandrel.

3. Apparatus according to claim 2 including means for displacing the band clear of the mandrel during indexing of the mandrel away from towards the winding station.

4. Apparatus according to claim 1 wherein the means for removing the length of tubular pipe insulation comprises a gripper unit consisting of a pair of jaws operable to engage said length and movable axially of the mandrel to draw the length axially off the mandrel.

5. Apparatus according to claim 4 in which the jaws have gripping surfaces shaped to match the general circular shape of the length and have a width corresponding to a major proportion of the length of the length of tubular pipe insulation in order to spread the gripping action of the jaws over a substantial area of the insulation.

* * * * *